United States Patent
Morimura et al.

(10) Patent No.: US 11,281,224 B2
(45) Date of Patent: Mar. 22, 2022

(54) VEHICLE CONTROL DEVICE

(71) Applicant: TOYOTA JIDOSHA KABUSHIKI KAISHA, Toyota (JP)

(72) Inventors: Junichi Morimura, Shizuoka-ken (JP);
Junya Watanabe, Shizuoka-ken (JP);
Seiji Arakawa, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 16/124,994

(22) Filed: Sep. 7, 2018

(65) Prior Publication Data
US 2019/0129434 A1 May 2, 2019

(30) Foreign Application Priority Data
Oct. 26, 2017 (JP) .............................. JP2017-206926

(51) Int. Cl.
*G05D 1/02* (2020.01)
*G05D 1/00* (2006.01)
(Continued)

(52) U.S. Cl.
CPC .......... *G05D 1/0214* (2013.01); *B60W 10/18* (2013.01); *B60W 10/20* (2013.01); *B60W 30/12* (2013.01); *G05D 1/0027* (2013.01); *G05D 1/0088* (2013.01); *G05D 1/0287* (2013.01); *B60W 2556/00* (2020.02); *G05D 2201/0213* (2013.01)

(58) Field of Classification Search
CPC ........ G05D 1/0214; G05D 2201/0213; B60W 2556/45; B60W 2556/50; B60W 2420/42; B60W 2420/52
See application file for complete search history.

(56) References Cited

U.S. PATENT DOCUMENTS 9,196,164 B1 * 11/2015 Urmson ................. G08G 1/166
9,881,503 B1 * 1/2018 Goldman-Shenhar ......................
G05D 1/0088
(Continued)

FOREIGN PATENT DOCUMENTS

JP 2009-009281 A 1/2009
JP 2009543258 A 12/2009
(Continued)

*Primary Examiner* — Alan D Hutchinson
*Assistant Examiner* — Andy Schneider
(74) *Attorney, Agent, or Firm* — Sughrue Mion, PLLC

(57) ABSTRACT

A vehicle control device includes an external situation recognition unit configured to recognize an external situation around a vehicle to recognize a traffic participant, an action schedule acquisition unit configured to acquire a first action schedule of the vehicle, an action schedule notification unit configured to notify a terminal possessed by the traffic participant of the first action schedule of the vehicle to request an approval of the first action schedule, a receiver configured to receive the approval of the first action schedule from the terminal; and an execution controller configured to execute an operation of the vehicle in accordance with the first action schedule when the receiver receives the approval of the first action schedule from the terminal and to suppress the operation of the vehicle in accordance with the first action schedule when the receiver does not receive the approval of the first action schedule from the terminal.

11 Claims, 5 Drawing Sheets

(51) Int. Cl.
*B60W 10/20* (2006.01)
*B60W 30/12* (2020.01)
*B60W 10/18* (2012.01)

(56) References Cited

U.S. PATENT DOCUMENTS

| | | | | |
|---|---|---|---|---|
| 2012/0056734 | A1* | 3/2012 | Ikeda | G08G 1/165 |
| | | | | 340/425.5 |
| 2016/0121791 | A1* | 5/2016 | Shimizu | G08G 1/166 |
| | | | | 340/435 |
| 2017/0140651 | A1* | 5/2017 | Lee | G08G 1/166 |
| 2017/0359565 | A1* | 12/2017 | Ito | H04N 13/243 |
| 2017/0364066 | A1* | 12/2017 | Yamada | B60W 10/20 |
| 2018/0061236 | A1 | 3/2018 | Yamamoto | |
| 2019/0018419 | A1* | 1/2019 | Lee | G05D 1/0289 |
| 2019/0094882 | A1* | 3/2019 | Kim | B60W 10/20 |

FOREIGN PATENT DOCUMENTS

| | | | |
|---|---|---|---|
| JP | 2013-149296 | A | 8/2013 |
| JP | 2014048732 | A | 3/2014 |
| WO | 2008008404 | A2 | 1/2008 |
| WO | 2016147623 | A1 | 9/2016 |

* cited by examiner

VEHICLE CONTROL DEVICE

INCORPORATION BY REFERENCE

The disclosure of Japanese Patent Application No. 2017-206926 filed on Oct. 26, 2017 including the specification, drawings and abstract is incorporated herein by reference in its entirety.

BACKGROUND

1. Technical Field

The present disclosure relates to a vehicle control device.

2. Description of Related Art

In the related art, a pedestrian crossing assistance system disclosed in Japanese Unexamined Patent Application Publication No. 2013-149296 (JP 2013-149296 A) is known. In the pedestrian crossing assistance system disclosed in JP 2013-149296 A, pedestrian crossing signal display means capable of notifying a pedestrian of an action schedule of a vehicle (hereinafter, simply referred to as "action schedule") is mounted on a roof of the vehicle, and when the pedestrian can safely cross a road while the vehicle is stopped, the pedestrian crossing signal display means lights up in green to notify the pedestrian that the crossing is possible. When the vehicle is stopped but the vehicle starts to travel within a certain time, the green light flickers to notify the pedestrian that the vehicle starts to travel within the certain time. When the vehicle travels, that is, when the crossing of the road is dangerous for the pedestrian, the pedestrian crossing signal display means lights up in red to notify the pedestrian that the crossing of the road is dangerous.

SUMMARY

In JP 2013-149296 A, a vehicle side does not grasp whether the pedestrian understands the action schedule of the vehicle after the pedestrian is notified of the action schedule of the vehicle by a signal display of the red lighting. Consequently, when the pedestrian does not understand even with the signal display of the red lighting, the vehicle side may not appropriately respond.

An aspect of the disclosure relates to a vehicle control device including an external situation recognition unit, an action schedule acquisition unit, an action schedule notification unit, a receiver, and an execution controller. The external situation recognition unit is configured to recognize an external situation around a vehicle to recognize a traffic participant. The action schedule acquisition unit is configured to acquire a first action schedule of the vehicle. The action schedule notification unit is configured to notify a communication terminal (hereinafter, referred to as "terminal") possessed by the traffic participant of the first action schedule of the vehicle to request an approval of the first action schedule. The receiver is configured to receive the approval of the first action schedule from the terminal. The execution controller is configured to execute an operation of the vehicle in accordance with the first action schedule when the receiver receives the approval of the first action schedule from the terminal and to suppress the operation of the vehicle in accordance with the first action schedule when the receiver does not receive the approval of the first action schedule from the terminal.

In the vehicle control device, when the traffic participant around the vehicle is recognized, the terminal possessed by the traffic participant (traffic participant terminal) is notified of the first action schedule of the vehicle, and the approval of the traffic participant is requested for the notified first action schedule. The traffic participant is a person who possesses the traffic participant terminal and can perform input to the traffic participant terminal. When the approval is received from the traffic participant terminal, an operation of the vehicle in accordance with the notified first action schedule is executed. When the approval is not received from the traffic participant terminal, the operation of the vehicle in accordance with the notified first action schedule is suppressed. Therefore, after confirmation is made that the traffic participant understands and approves the first action schedule of the vehicle, the vehicle can execute the first action schedule. When the confirmation cannot be made that the traffic participant approves the first action schedule of the vehicle, the vehicle can suppress the operation of the vehicle in accordance with the notified first action schedule. As a result, the vehicle can take a safer action.

The vehicle control device according to the aspect may further include a vehicle position acquisition unit configured to acquire a position of the vehicle and a traveling plan generation unit configured to generate a first traveling plan of the vehicle based on the position of the vehicle acquired by the vehicle position acquisition unit and the external situation of the vehicle recognized by the external situation recognition unit. The action schedule acquisition unit may acquire information relating to vehicle behavior as the first action schedule of the vehicle from the first traveling plan of the vehicle generated by the traveling plan generation unit. According to the aspect of the disclosure, the vehicle can generate the first traveling plan for the autonomous driving from the acquired position and the external situation, and acquire the first action schedule to notify the traffic participant of the traveling plan.

The vehicle control device according to the aspect may further include a vehicle position acquisition unit configured to acquire a position of the vehicle and a terminal position recognition unit configured to acquire position information of the terminal possessed by the traffic participant. The external situation recognition unit may acquire a position of the traffic participant based on the position of the vehicle acquired by the vehicle position acquisition unit and a relative position between the vehicle and the traffic participant acquired by an external sensor, and may compare the position of the traffic participant with the position information of the terminal possessed by the traffic participant acquired by the terminal position recognition unit to specify the position of the traffic participant who possesses the terminal. According to the aspect of the disclosure, the external situation recognition unit can recognize the information of the terminal of the traffic participant in association with the position information of the traffic participant.

In the vehicle control device according to the aspect, when the receiver does not receive the approval from the terminal, the traveling plan generation unit may generate a second traveling plan different from the first traveling plan, and the execution controller may control the vehicle in accordance with the second traveling plan. According to the aspect of the disclosure, when the approval of the traffic participant is not received, the vehicle can travel based on a safer traveling plan.

In the vehicle control device according to the aspect, the second traveling plan may include at least one of (i) decelerating from a vehicle speed of the vehicle in the first traveling plan, (ii) decelerating before reaching the traffic participant, (iii) stopping temporarily in front of the traffic participant, (iv) stopping in front of the traffic participant, or (v) stopping autonomous driving control.

According to the aspect of the disclosure, after an understanding of the traffic participant with respect to the action schedule of the vehicle is confirmed, the vehicle can take a safe action.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
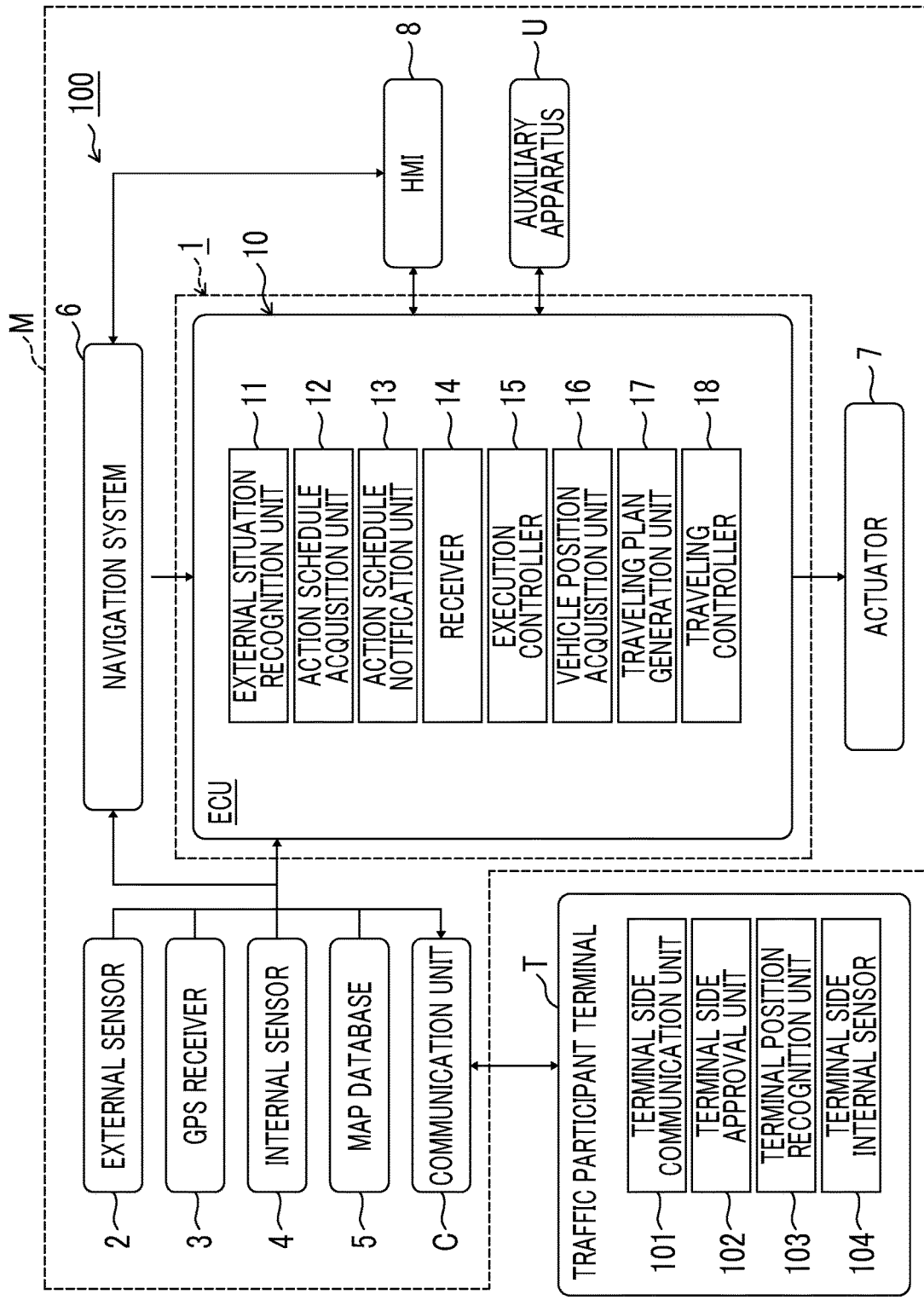
FIG. 1 is a block diagram showing a configuration of a vehicle on which a vehicle control device according to a first embodiment is mounted and a configuration of a traffic participant terminal.

Hereinafter, embodiments will be described with reference to drawings. In the following description, the same reference numeral will be assigned to the same or corresponding element, and a redundant description will be omitted.

First Embodiment

FIG. 1 is a block diagram showing configurations of a vehicle on which a vehicle control device according to a first embodiment is mounted and a terminal possessed by a traffic participant. As shown in FIG. 1, a vehicle control device 1 is mounted on a vehicle M which is an autonomous driving vehicle including an autonomous driving system 100. Autonomous driving is vehicle control in which the vehicle M automatically travels toward a destination set in advance without a driving operation by an occupant (including driver or the like) of the vehicle M. The autonomous driving system 100 will be described.

The autonomous driving system 100 is a system that causes the vehicle M to travel by the autonomous driving. The autonomous driving system 100 includes an external sensor 2, a global positioning system (GPS) receiver 3, an internal sensor 4, a map database 5, a navigation system 6, an actuator 7, a human machine interface (HMI) 8, and an electronic control unit (ECU) 10.

The external sensor 2 is a detection apparatus that detects a surrounding environment (external situation) which is an environment surrounding the vehicle M. The external sensor 2 includes at least one of a camera or a radar sensor. The camera is an imaging apparatus that images the surrounding environment. The camera is provided, for example, on a back side of a windshield of the vehicle M. The camera transmits imaging information to an ECU 10. The camera may be a monocular camera or a stereo camera. The stereo camera has two imaging units disposed so as to reproduce a binocular parallax. Information in the depth direction is also included in imaging information of the stereo camera. The radar sensor is a detection apparatus that detects an object around the vehicle M using a radio wave (for example, millimeter wave) or light. The radar sensor includes, for example, a millimeter wave radar or Laser Imaging Detection and Ranging (LIDAR). The radar sensor transmits a radio wave or light around the vehicle M and receives a radio wave or light reflected from the object to detect the object. The radar sensor transmits object information to the ECU 10. The number and position of each of mounted cameras and radar sensors are not particularly limited.

The GPS receiver 3 receives signals from three or more GPS satellites and acquires position information indicating a position of the vehicle M. The position information includes, for example, a latitude and a longitude. The GPS receiver 3 transmits the measured position information of the vehicle M to the ECU 10. Another means capable of specifying a latitude and a longitude where the vehicle M is present may be used instead of the GPS receiver 3.

The internal sensor 4 is a detection apparatus that detects a state of the vehicle M (motion state of vehicle M). The internal sensor 4 includes at least a vehicle speed sensor. The vehicle speed sensor is a measurement apparatus that measures a speed of the vehicle M. As the vehicle speed sensor, a tire-wheel assembly speed sensor that is provided on a tire-wheel assembly of the vehicle M, on a drive shaft rotating integrally with the tire-wheel assembly, or the like and measures a rotation speed of the tire-wheel assembly is used. The vehicle speed sensor transmits the measured vehicle speed information of the vehicle M to the ECU 10. The internal sensor 4 may include an acceleration sensor or a yaw rate sensor. The acceleration sensor is a measurement apparatus that measures acceleration of the vehicle M. The acceleration sensor includes a front-rear acceleration sensor that measures acceleration in the front-rear direction of the vehicle M and a lateral acceleration sensor that measures lateral acceleration of the vehicle M. The acceleration sensor transmits the pieces of acceleration information to the ECU 10. The yaw rate sensor is a measurement apparatus that measures a yaw rate (rotation angular velocity) around the vertical axis of the center of gravity of the vehicle M. For example, a gyro sensor may be used as the yaw rate sensor. The yaw rate sensor transmits the measured yaw rate information of the vehicle M to the ECU 10.

The map database 5 is a database that stores map information. The map database 5 is formed in a hard disk drive (HDD) mounted on the vehicle M. The map information includes position information of a road, lane information, road type information, road shape information, position information of an intersection or a junction, position information of a building, and the like. The road type information distinguishes a type of the road such as an automobile road or a general road. The road shape information is, for example, type information such as a curved portion or a straight portion, a road curvature, and the like. The map database 5 may be stored in a computer of a facility such as an information processing center capable of communicating with the vehicle M.

A communication unit C is a device that performs communication between the vehicle M and the outside of the vehicle. The communication unit C communicates with a communicable terminal around the vehicle M. The communication unit C does not need to directly communicate with the communicable terminal around the vehicle M and may communicate via a base station or the like. A communication method is not particularly limited.

The navigation system 6 guides the occupant of the vehicle M to the destination set in advance. The navigation system 6 recognizes a traveling road and a traveling lane where the vehicle M travels based on the position of the vehicle M measured by the GPS receiver 3 and the map information of the map database 5. The navigation system 6 calculates a target route from the position of the vehicle M to the destination. The navigation system 6 uses a display panel and a speaker to guide the target route to the occupant. The navigation system 6 transmits the position information of the vehicle M, the information on the traveling lane of vehicle M, and the information on the target route of the vehicle M to the ECU 10.

The actuator 7 is a device that executes traveling control of the vehicle M. The actuator 7 includes at least an engine actuator, a brake actuator, and a steering actuator. The engine actuator changes a supply amount of air to an engine (for example, changes throttle opening degree) according to a control signal from the ECU 10 to control driving force of the vehicle M. When the vehicle M is a hybrid vehicle or an electric vehicle, the engine actuator controls driving force of a motor as a power source. The brake actuator controls a brake system according to the control signal from the ECU 10 to control braking force provided to tire-wheel assemblies of the vehicle M. For example, a hydraulic brake system may be used as the brake system. When the vehicle M includes a regenerative brake system, the brake actuator may control both the hydraulic brake system and the regenerative brake system. The steering actuator controls driving of an assist motor that controls steering torque of an electric power steering system according to the control signal from the ECU 10. According to the above description, the steering actuator controls the steering torque of the vehicle M.

The HMI 8 is an interface for outputting and inputting information to and from the occupant of the vehicle M. The HMI 8 includes an apparatus such as a steering wheel, an accelerator pedal, a brake pedal, a shift lever, and various switches on which the occupant performs an input operation related to vehicle behavior. The HMI 8 may include a display panel for displaying image information to the occupant, a speaker for outputting a sound, and an operation button or a touch panel for performing the input operation by the occupant. The HMI 8 transmits information input by the occupant to the ECU 10. The HMI 8 displays the image information according to the control signal from the ECU 10 on a display.

An auxiliary apparatus U is an apparatus that can be recognized from the outside of the vehicle M. The auxiliary apparatus U collectively refers to an apparatus not included in the actuator 7. The auxiliary apparatus U includes, for example, a direction indicator, a headlight, a wiper, a speaker, and a display.

The ECU 10 is an electronic control unit having a central processing unit (CPU), a read only memory (ROM), a random access memory (RAM), a controller area network (CAN) communication circuit, and the like. The ECU 10 is connected to, for example, a network that communicates using the CAN communication circuit and is connected so as to be capable of communicating with a component of the vehicle M. The ECU 10 operates the CAN communication circuit, for example, based on a signal output from the CPU to input and output data, stores the input data in the ROM, loads a program stored in the ROM into the RAM, and executes the program loaded in the RAM to realize a function of the component of the ECU 10. The ECU 10 may be configured to have a plurality of electronic control units. The vehicle control device 1 includes the ECU 10, which includes a vehicle position acquisition unit 16, a traveling plan generation unit 17, and a traveling controller 18 as a functional configuration.

The vehicle position acquisition unit 16 recognizes a position of the vehicle M on a map (hereinafter, referred to as "vehicle position") based on the position information of the vehicle M received by the GPS receiver 3 and the map information of the map database 5. The vehicle position acquisition unit 16 may acquire the vehicle position used by the navigation system 6 from the navigation system 6 to recognize the vehicle position. When the vehicle position of the vehicle M can be measured by a sensor provided in the outside such as road, the vehicle position acquisition unit 16 may acquire the vehicle position from the sensor by the communication.

The traveling plan generation unit 17 generates a traveling plan of the vehicle M based on at least any of detection results of the external sensor 2 and the internal sensor 4, the position information of the vehicle M recognized by the vehicle position acquisition unit 16, the map information of the map database 5, various pieces of information transmitted from the navigation system 6, or an external situation recognized by an external situation recognition unit 11 based on the detection result of the external sensor 2. Obstacle information is information relating to at least any of a position, a size, range, or a movement direction and speed of one or a plurality of obstacles (including guardrail, street tree, building, person, animal, bicycle, another vehicle, or the like) around the vehicle M.

When the occupant performs a start operation of the autonomous driving, the traveling plan generation unit 17 starts the generation of the traveling plan. The traveling plan includes a long-term traveling plan from a current position of the vehicle M until the vehicle M reaches the destination set in advance and a short-term traveling plan corresponding to an actual road environment or surrounding environment. The long-term traveling plan depends on the map information. The short-term traveling plan is a plan for the vehicle M to travel in a detection range (for example, range within 150 m in front of the vehicle M) of the external sensor 2.

The traveling plan generation unit 17 generates the long-term traveling plan of the vehicle M based on the target route set by the navigation system 6 and the map information of the map database 5. The long-term traveling plan has a control target value of the vehicle M according to a position on the target route of the vehicle M. The position on the target route is a position in an extending direction of the target route on the map. The positions on the target route mean setting longitudinal positions set for each predetermined space (for example, 1 m) in the extending direction of the target route. The control target value is a value which is a control target of the vehicle M in the long-term traveling plan. The control target value is set in association with each setting longitudinal position on the target route. The traveling plan generation unit 17 sets the setting longitudinal positions having the predetermined space on the target route and sets the control target value for each setting longitudinal position to generate the long-term traveling plan. The setting longitudinal position and a target lateral position may be set together as one position coordinate. The setting longitudinal position and the target lateral position mean information on a longitudinal position and information on a lateral position which are set as targets in the long-term traveling plan.

The traveling plan generation unit 17 generates the short-term traveling plan based on the detection results of the external sensor 2 and the internal sensor 4, the obstacle information, the position of the vehicle M, and the long-term traveling plan. The position of the vehicle M is a position of the vehicle M on the map recognized based on the position information of the vehicle M received by the GPS receiver 3 and the map information of the map database 5. The position of the vehicle M may be recognized by acquiring the vehicle position used by the navigation system 6 from the navigation system 6. Alternatively, when the vehicle position of the vehicle M can be measured by a sensor provided on a roadside, the position of the vehicle M may be recognized by acquiring the vehicle position from the sensor by the communication.

The short-term traveling plan has a short-term control target value according to the setting longitudinal position on the target route similarly to the traveling plan. The short-term control target value is a value that is the control target of the vehicle M in the short-term traveling plan. The short-term control target value is set in association with each setting longitudinal position on the target route. The short-term control target value includes the short-term target lateral position of the vehicle M and a short-term target vehicle speed of the vehicle M. The short-term target lateral position is the lateral position of the vehicle M that is the control target in the short-term traveling plan. The short-term target vehicle speed is a vehicle speed of the vehicle M that is the control target in the short-term traveling plan.

The traveling controller 18 transmits the control signal to the actuator 7 based on the traveling plan generated by the traveling plan generation unit 17. According to the above description, the vehicle M is controlled, and the vehicle M automatically travels according to the traveling plan.

A configuration of a traffic participant terminal T will be described. A traffic participant who possesses the traffic participant terminal T is a person who can participate in traffic, receives a notification from the traffic participant terminal T while participating the traffic, and can perform input to the traffic participant terminal T. The traffic participant is, for example, a pedestrian or a bicycle driver.

The traffic participant terminal T is a terminal possessed by the traffic participant. Various traffic participant terminals T may be employed as long as the communication with the outside, the notification to the traffic participant, and the input from the traffic participant are possible. The traffic participant terminal T is, for example, a smartphone or a wearable device. When a notification of an action schedule of the vehicle M is received by the communication from the vehicle control device 1 described below and the traffic participant approves the action schedule of the vehicle M, the traffic participant terminal T transmits information relating to an approval to the vehicle control device 1 described below. Each traffic participant terminal T has a unique ID (identification information). The unique ID of each traffic participant terminal T is transmitted to the outside by the communication or the like.

The traffic participant terminal T includes a terminal side communication unit 101, a terminal side approval unit 102, a terminal position recognition unit 103, and a terminal side internal sensor 104.

The terminal side communication unit 101 can communicate with the communication unit C of the vehicle M. The communication with the communication unit C of the vehicle M may be direct communication or communication via the base station or the like.

The terminal side approval unit 102 notifies the traffic participant who possesses the traffic participant terminal T of the action schedule of the vehicle M received by the communication from an action schedule notification unit of the vehicle control device 1 described below to acquire the information relating to the approval based on the input by the traffic participant. The information relating to the approval acquired by the terminal side approval unit 102 is transmitted from the terminal side communication unit 101 to the vehicle M.

The terminal position recognition unit 103 receives signals from three or more GPS satellites and acquires position information indicating a position of the traffic participant terminal T. The position information includes, for example, a latitude and a longitude. The terminal position recognition unit 103 may transmit the measured position information of the traffic participant terminal T from the terminal side communication unit 101 to the vehicle M. Another means capable of specifying a latitude and a longitude where the traffic participant terminal T is present may be used instead of the terminal position recognition unit 103.

The terminal side internal sensor 104 is a detection apparatus that detects a state of the traffic participant terminal T (motion state of the traffic participant terminal T). The terminal side internal sensor 104 includes at least the acceleration sensor. The acceleration sensor is a measurement apparatus that measures the acceleration of the vehicle M. For example, the acceleration sensor includes at least any of the front-rear acceleration sensor that measures the acceleration in the front-rear direction, the lateral acceleration sensor that measures the lateral acceleration, or an upper-lower acceleration sensor that measures acceleration in the upper-lower direction. The terminal side internal sensor 104 may include an angular velocity sensor. The angular velocity sensor is a measurement apparatus that measures the rotation angular velocity around the center of gravity of the traffic participant terminal T. For example, the gyro sensor may be used as the angular velocity sensor. The angular velocity sensor may measure an angular velocity around at least any axis of the angular velocities around three axes (yaw, pitch, and roll) passing through the center of gravity of the traffic participant terminal T.

A configuration of the vehicle control device 1 will be described.

The vehicle control device 1 is a device that notifies the traffic participant terminal T possessed by the traffic participant around the vehicle M of the action schedule of the vehicle M and determines whether to execute the action schedule of the vehicle M based on whether the approval from the terminal possessed by the traffic participant is received.

The action schedule can be acquired from, for example, the traveling plan generated by the traveling plan generation unit 17. In the case, the action schedule includes at least one of pieces of information relating to the vehicle behavior such as an advancing direction (straight advance, right turn or left turn, or the like) scheduled by the vehicle M, acceleration and deceleration situations, traveling speed, temporary stop, passing through intersection, driving scene (overtaking, emergency road shoulder evacuation, or the like). The action schedule may use control target values of various driving assistance systems (not shown) such as pre-crash safety system (PCS), adaptive cruise control (ACC) system, lane keep assist (LKA) system in addition to the traveling plan generated by the traveling plan generation unit 17. The action schedule of the vehicle M may be estimated from operation input by the occupant of the vehicle M. The action schedule is not particularly limited, and various action schedules may be employed.

The vehicle control device 1 includes the ECU 10, which includes the external situation recognition unit 11, an action schedule acquisition unit 12, an action schedule notification unit 13, a receiver 14, and an execution controller 15, as shown in FIG 1.

The external situation recognition unit 11 recognizes the external situation of the vehicle M based on the detection result (for example, imaging information of the camera, obstacle information of the radar, and obstacle information of the LIDAR) of the external sensor 2. The external situation includes, for example, a position of a white line in a traveling lane or a position of the lane center and a road width with respect to the vehicle M, the road shape (for example, a curvature of the traveling lane, a slope change in a road surface effective for estimating the line of sight of the external sensor 2, undulation, or the like), and a situation of the obstacle around the vehicle M (for example, information that distinguishes between a fixed obstacle and a moving obstacle, a position of the obstacle with respect to the vehicle M, the movement direction of the obstacle with respect to the vehicle M, a relative speed of the obstacle with respect to the vehicle M, or the like). Collation between the detection result of the external sensor 2 and the map information is preferable to complement the accuracy of the position and direction of the vehicle M acquired by the GPS receiver 3 and the like.

The external situation recognition unit 11 recognizes the traffic participant around the vehicle M from among the recognized external situations. Here, the external situation recognition unit 11 associates the unique ID for the traffic participant terminal T described below acquired by the communication or the like with the position of the traffic participant among the recognized external situations to specify the traffic participant.

The external situation recognition unit 11 may collate pieces of position information using the position information of the vehicle M acquired by the GPS receiver 3, relative position information with the traffic participant recognized by the external sensor 2, and the position information of the traffic participant terminal T which is acquired by the terminal position recognition unit 103 of the traffic participant terminal T and is transmitted from the terminal side communication unit 101 to specify the traffic participant.

The external situation recognition unit 11 may use traffic participant specification information described below after candidates for a traffic participant to be specified are narrowed down using the position information of the vehicle M acquired by the GPS receiver 3 and the position information of the traffic participant terminal T received from the terminal side communication unit 101 of the traffic participant terminal T to specify the traffic participant.

The traffic participant specification information is used for specifying the traffic participant after the candidates for the traffic participant to be specified are narrowed down using the pieces of position information of the vehicle M and the traffic participant terminal T in the external situation recognition unit 11. For example, time-series information of the acceleration of the traffic participant terminal T may be used as the traffic participant specification information. Hereinafter, a method of specifying the traffic participant when the time-series information of the acceleration of the traffic participant terminal T is used will be described.

In a traffic participant terminal T side, the time-series information of the acceleration of the traffic participant terminal T can be acquired by measuring the acceleration using a terminal side internal sensor and recording the measured acceleration.

In a vehicle M side, time-series information of the acceleration of the traffic participant can be acquired as information corresponding to the time-series information of the acceleration of the traffic participant terminal T. In the vehicle M, time-series information of a relative speed between the traffic participant and the vehicle M can be acquired after the traffic participant is recognized using the external sensor 2. The time-series information of the acceleration of the traffic participant can be calculated from the time-series information of the acquired relative speed and the state of the vehicle M acquired by the internal sensor 4.

The external situation recognition unit 11 collates the time-series information of the acceleration of the traffic participant terminal T acquired on the traffic participant terminal T side with the time-series information of the acceleration of the traffic participant calculated on the vehicle M side to specify a candidate having the highest collation degree.

The traffic participant specification information may use not only the time-series information of the acceleration of the traffic participant but also time-series information of the speed.

An optical signal or the like may be used as the traffic participant specification information. When the optical signal is used, the traffic participant terminal T emits time-series pattern of the optical signal unique to the terminal and transmits optical signal specification information that associates the optical signal emitted from the terminal with the terminal ID by the communication. In the vehicle M side, a position of the optical signal and the time-series pattern of the optical signal are recognized using the external sensor 2, the optical signal specification information that associates the optical signal with the terminal ID is received by the communication, and the traffic participant terminal T is specified using the optical signal recognized using the external sensor and the optical signal specification information received by the communication.

As described above, various pieces of information that can be transmitted and received between the traffic participant terminal T and the vehicle M may be used as the traffic participant specification information.

The action schedule acquisition unit 12 acquires the action schedule of the vehicle M. In the first embodiment, the action schedule acquisition unit 12 acquires the traveling plan of the vehicle M from the traveling plan generation unit 17 and acquires the action schedule of the vehicle M from the traveling plan.

The action schedule notification unit 13 outputs the notification of the action schedule of the vehicle M acquired by the action schedule acquisition unit 12 with respect to the traffic participant recognized by the external situation recognition unit 11. The notification of the action schedule of the vehicle M output from the action schedule notification unit 13 is transmitted from the communication unit C to the terminal side communication unit 101, and the traffic participant is notified of the action schedule through the traffic participant terminal T. The traffic participant around the vehicle M may be notified of the action schedule output from the action schedule notification unit 13 through the auxiliary apparatus U. Means for notifying the action schedule output from the action schedule notification unit 13 is not particularly limited as long as the traffic participant around the vehicle M can recognize the notification, and the action schedule may be notified using various means.

The receiver 14 receives the information relating to the approval of the traffic participant with respect to the action schedule of the vehicle M notified by the action schedule notification unit 13. The action schedule notification unit 13 receives the information relating to the approval acquired by the terminal side approval unit 102 of the traffic participant terminal T through the communication between the terminal side communication unit 101 and the communication unit C. Means for receiving the information is not limited to the communication between the terminal side communication unit 101 and the communication unit C as long as the information relating to the approval acquired by the terminal side approval unit 102 of the traffic participant terminal T can be received.

The execution controller 15 determines whether to execute the action schedule of the vehicle M or suppress the execution based on the information relating to the approval of the traffic participant received by the receiver 14. When the approval of the traffic participant is received by the receiver 14, the execution controller 15 determines to execute the action schedule of the vehicle M. When the approval of the traffic participant is not received by the receiver 14, the execution controller 15 determines to suppress the execution of the action schedule of the vehicle M.

In the first embodiment, when the execution controller 15 determines to execute the action schedule of the vehicle M, the traveling plan generated by the traveling plan generation unit 17 is not overwritten by another traveling plan, and the traveling controller 18 transmits the control signal to the actuator 7 based on the traveling plan. According to the above description, the vehicle M is controlled, and the vehicle M automatically travels according to the traveling plan.

On the other hand, when the execution controller 15 determines to suppress the execution of the action schedule of the vehicle M, the automatic traveling of the vehicle M according to the traveling plan is suppressed. The suppression of the execution of the action schedule means, for example, that a new traveling plan in which the execution of the action schedule included in the traveling plan so far is suppressed is generated in the traveling plan generation unit 17, and the traveling controller 18 transmits the control signal to the actuator based on the new traveling plan to cause the vehicle M to automatically travel according to the new traveling plan. In the case, the new traveling plan may include suppressing the vehicle speed of the vehicle M and decelerating, stopping temporarily, and stopping before the vehicle M reaches around the traffic participant. When the execution controller 15 determines to suppress the execution of the action schedule of the vehicle M, autonomous driving control may be stopped after the occupant of the vehicle M is informed. Alternatively, the traveling plan output from the traveling plan generation unit 17 to the traveling controller 18 may be overwritten by the control signal from another driving assistance system such as pre-crash safety system (PCS).

An example of a process executed by the vehicle control device 1 will be described.

Figure 2:
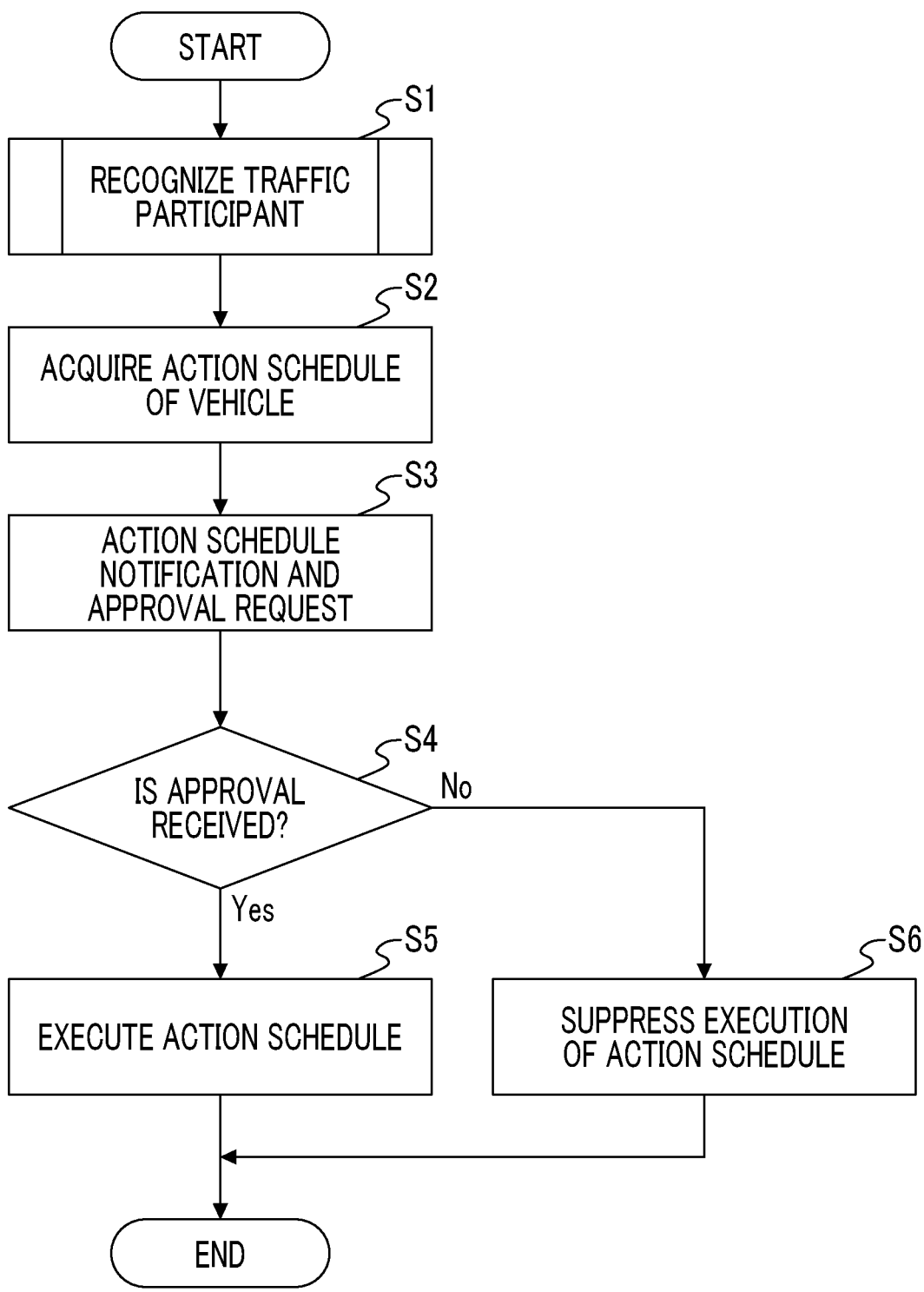
FIG. 2 is a flowchart showing an example of a process executed by the vehicle control device according to the first embodiment.
Figure 3:
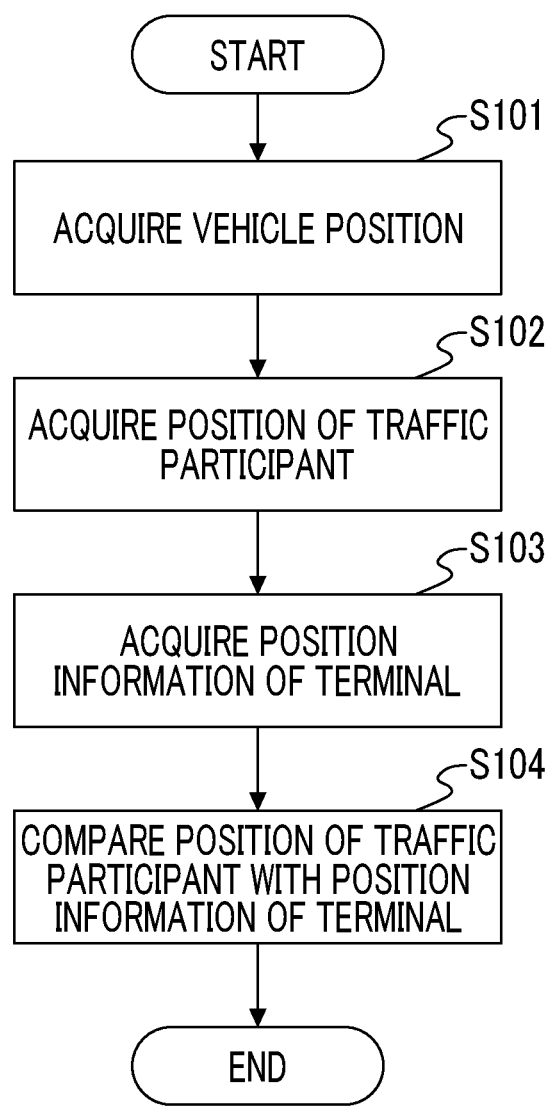
FIG. 3 is a flowchart showing an example of a traffic participant recognition process of FIG. 2.

FIG. 2 is a flowchart showing the example of the process executed by the vehicle control device 1. FIG. 3 is a flowchart showing an example of an action schedule acquisition process of FIG. 2. In the vehicle control device 1, for example, at the same time that the autonomous driving is started by the autonomous driving system 100, the following process is started.

As shown in FIG. 2, the traffic participant is recognized by the external situation recognition unit 11 (step S1). The action schedule of the vehicle M is acquired by the action schedule acquisition unit 12 (step S2). In step S2, for example, the action schedule is acquired from the traveling plan generated by the traveling plan generation unit 17.

The action schedule notification unit 13 notifies the traffic participant of the action schedule of the vehicle M, and the approval of the traffic participant is requested (step S3). After step S3, the information relating to the approval of the traffic participant is received by the receiver 14, and determination is made whether the execution controller 15 receives the approval (step S4). In a case of Yes in step S4, the execution controller 15 causes the traveling controller 18 to control the vehicle M based on the traveling plan to execute the action schedule (step S5). In a case of No in step S4, the execution controller 15 suppresses the automatic traveling of the vehicle M according to the traveling plan (that is, execution of the action schedule) (step S6).

In the traffic participant recognition process in step S1, as shown in FIG. 3, the vehicle control device 1 acquires the position of the vehicle M (step S101). In step S101, for example, the position of the vehicle M is acquired based on the position information acquired by the GPS receiver 3.

After step S101, the vehicle control device 1 acquires the position of the traffic participant (step S102). In step S102, for example, the relative position between the traffic participant around the vehicle M and the vehicle M is acquired by the external sensor 2, and the position of the traffic participant is acquired using the position of the vehicle M acquired in step S101 and the relative position between the traffic participant and the vehicle M.

After step S102, the vehicle control device 1 acquires the position information of the traffic participant terminal T (step S103). In step S103, for example, the position information acquired by the terminal position recognition unit is acquired by the communication.

After step S103, the vehicle control device 1 collates the position of the traffic participant acquired in step S102 with the position information of the traffic participant terminal T acquired in step S103 to specify the position of the traffic participant who possesses the traffic participant terminal T (step S104).

As described above, in the vehicle control device 1 according to the first embodiment, the action schedule of the vehicle M is acquired from the traveling plan generated by the traveling plan generation unit 17, the traffic participant terminal T is notified of the acquired action schedule, and the approval is requested. The autonomous driving system 100 according to the first embodiment executes the action schedule when the vehicle control device 1 receives the approval of the traffic participant and suppresses the execution of the action schedule when the vehicle control device 1 does not receive the approval of the traffic participant. According to the above description, when the traffic participant around the vehicle M does not show an understanding of the action schedule of the vehicle M, the vehicle M can take a safer action.

As described above, the first embodiment is described, but the disclosure is not limited to the embodiment and is implemented in various forms. Some configurations mounted on the vehicle M in the first embodiment are not necessarily mounted on the vehicle M. For example, the external sensor 2 may be configured to be included as an external surrounding facility not mounted on the vehicle M, detect the surrounding environment (external situation) which is the environment surrounding the vehicle M from the outside of the vehicle M, and transmit the detected information to the vehicle M side by the communication.

The ECU 10 may be configured to transmit the signal to the apparatus such as the HMI 8, the auxiliary apparatus U, and the actuator 7 mounted on the vehicle M using the communication from the outside of the vehicle M.

The vehicle position acquisition unit 16, the traveling plan generation unit 17, and the traveling controller 18 which are functional configurations of the ECU 10 may be included as functional configurations of the vehicle control device 1.

Second Embodiment

A second embodiment will be described. In the following description, differences from the first embodiment will be described and a redundant description will be omitted.

Figure 4:
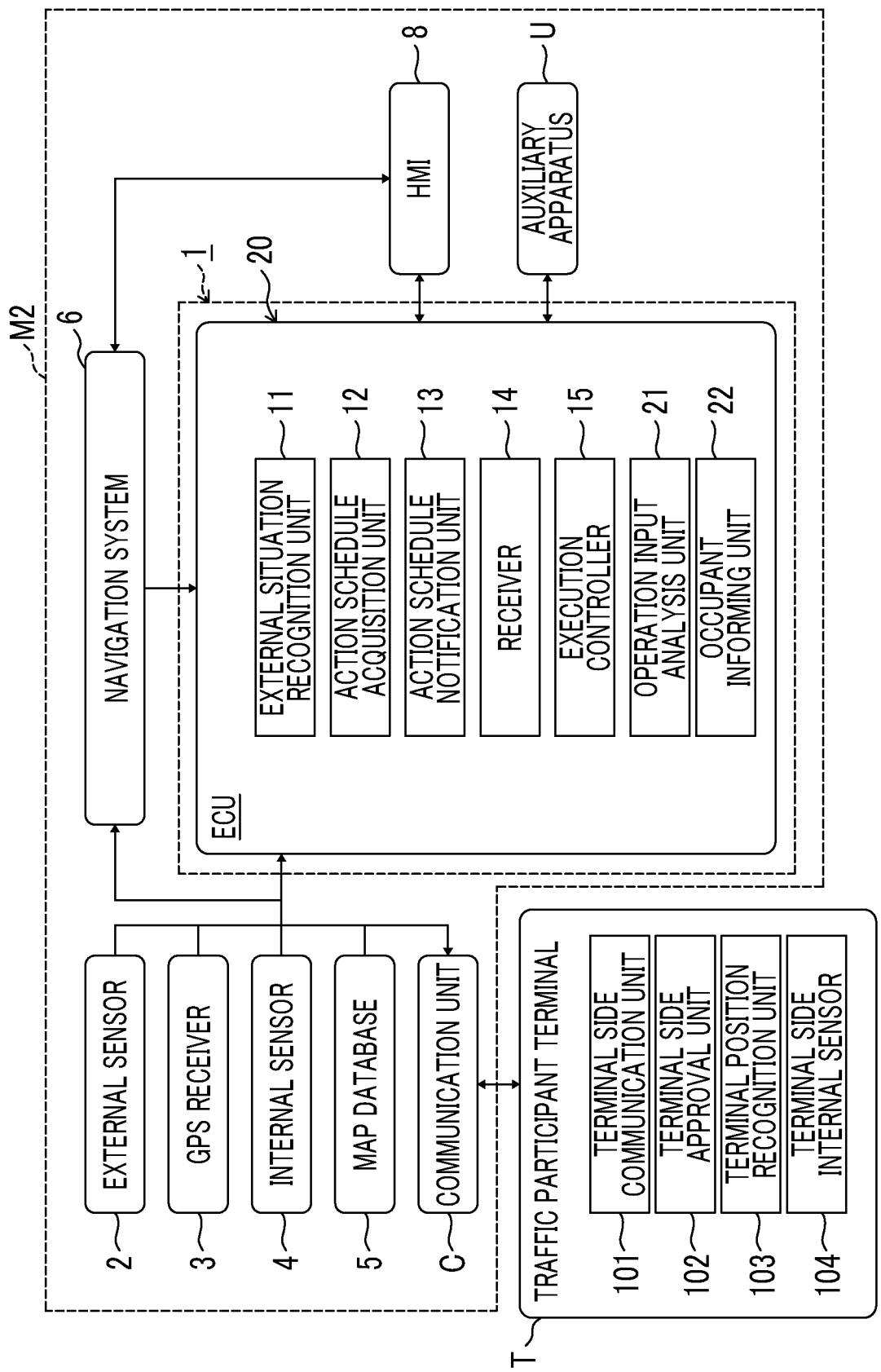
FIG. 4 is a block diagram showing a configuration of a vehicle on which a vehicle control device according to a second embodiment is mounted.

FIG. 4 is a block diagram showing a configuration of a vehicle M2 on which a vehicle control device according to the second embodiment is mounted. As shown in FIG. 4, the second embodiment is different from the first embodiment in that the vehicle M2 does not include the autonomous driving system 100 and an ECU 20 includes an operation input analysis unit 21 and an occupant informing unit 22 instead of including the traveling plan generation unit 17 and the traveling controller 18 as compared with the ECU 10.

The operation input analysis unit 21 acquires the operation input from the occupant which is input to the HMI 8 and analyzes the operation input. For example, the operation input analysis unit 21 stores past operation input patterns for each type of vehicle actions and compares a current operation input pattern with the past operation input patterns to estimate an action type to which the current operation is applied.

The action schedule acquisition unit 12 acquires an estimation result of an action schedule of the vehicle M2 from a result analyzed by the operation input analysis unit 21.

The descriptions of the operations of the external situation recognition unit 11, the action schedule notification unit 13, the receiver 14, and the execution controller 15 are the same as the descriptions in the first embodiment and will be omitted.

The occupant informing unit 22 generates informing contents to the occupant according to the determination result of the execution controller 15 and controls the HMI 8 based on the generated informing contents. When the execution controller 15 determines to suppress the execution of the action schedule, the occupant informing unit 22 informs the occupant to prompt the suppression of the execution of the action schedule. The informing the occupant to prompt the suppression of the execution of the action schedule includes, for example, prompting deceleration or stop by the display or the sound of the HMI 8.

As described above, in the vehicle M2 according to the second embodiment, the action schedule of the vehicle M2 is estimated from the operation input of the occupant, the approval of the traffic participant is requested with respect to the estimated action schedule, and the occupant of the vehicle M2 is informed to prompt the suppression of the execution of the action schedule when the approval is not received. According to the above description, when the traffic participant does not show an understanding of the action schedule of the vehicle M2, the occupant can be prompted to take a safer driving action.

Third Embodiment

A third embodiment will be described. In the following description, differences from the first embodiment will be described and a redundant description will be omitted.

Figure 5:
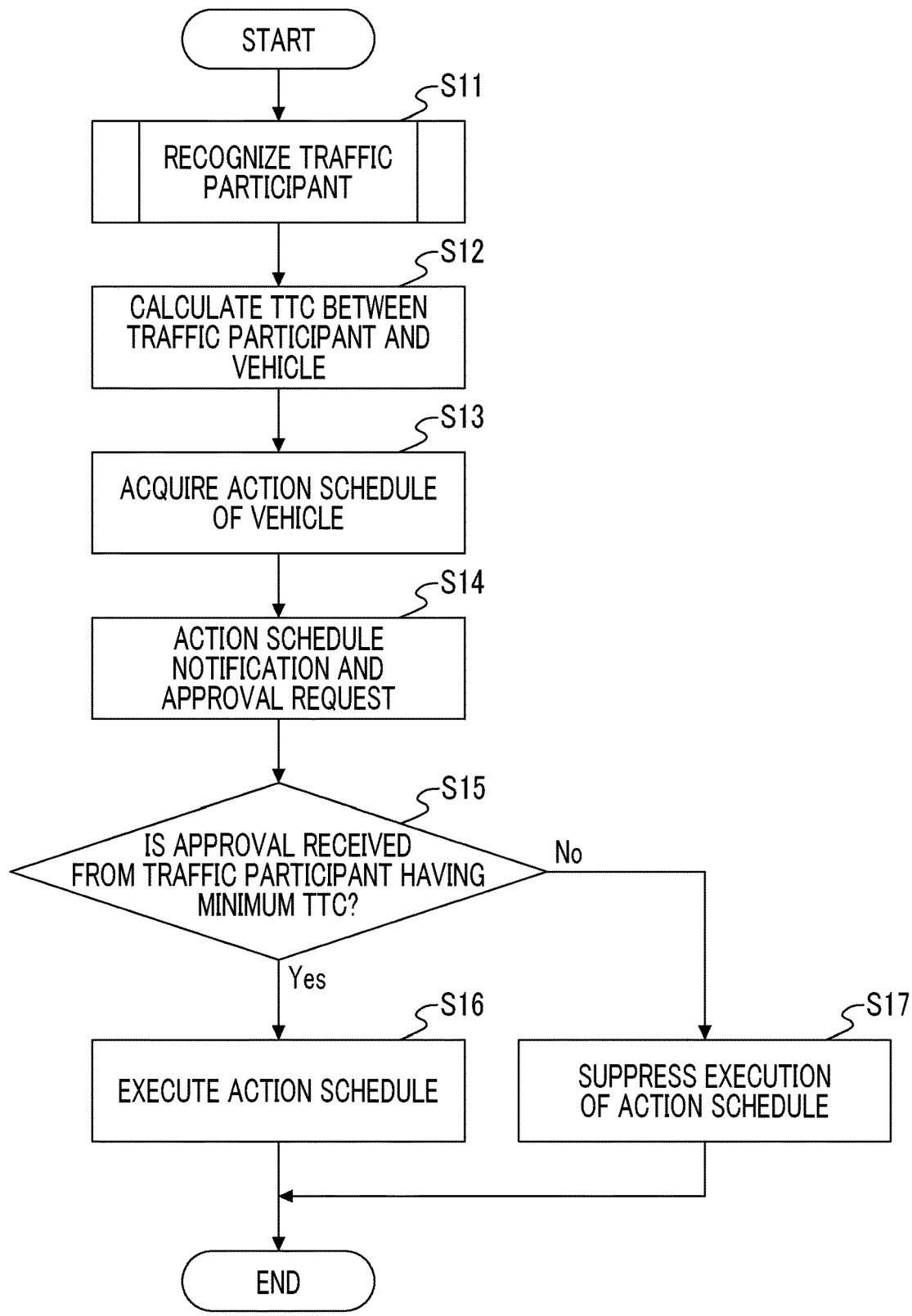
FIG. 5 is a flowchart showing an example of a process executed by a vehicle control device according to a third embodiment.

FIG. 5 is a flowchart showing an example of a process executed by a vehicle control device 1 according to the third embodiment.

As shown in FIG. 5, the traffic participant is recognized by the external situation recognition unit 11 (step S11). A time to collision (TTC) between the traffic participant recognized in step S11 and the vehicle M is calculated (step S12). The TTC between the traffic participant and the vehicle M can be obtained by dividing a relative distance between the traffic participant and the vehicle M which can be acquired by the external sensor 2 by a relative speed between the traffic participant and the vehicle M which can be acquired by the external sensor 2.

After step S12, the action schedule of the vehicle M is acquired by the action schedule acquisition unit 12 (step S13). In step S13, for example, the action schedule is acquired from the traveling plan generated by the traveling plan generation unit 17. After step S13, the traffic participant is notified of the action schedule of the vehicle M by the action schedule notification unit, and the approval of the traffic participant is requested (step S14).

After step S14, information relating to the approval of the traffic participant who has the minimum TTC calculated in step S12 is received by the receiver 14, and determination is made whether the execution controller 15 receives the approval from the traffic participant who has the minimum TTC (step S15). In a case of Yes in step S15, the traveling controller 18 controls the vehicle M based on the traveling plan to execute the action schedule (step S16). In a case of No in step S15, the automatic traveling of the vehicle M according to the traveling plan (that is, execution of the action schedule) is suppressed (step S17).

As described above, in the vehicle control device 1 according to the third embodiment, when the traffic participant who has the minimum TTC with respect to the vehicle M among the traffic participants around the vehicle M does not show an understanding of the action schedule of the vehicle M, the vehicle M can take a safer action.

As described above, the embodiments are described, but the disclosure is not limited to the embodiments and is implemented in various forms. For example, in the embodiments, the execution controller 15 determines whether to execute the action schedule. However, the determination is not necessarily performed to be made by the execution controller 15 and may be made by another configuration such as the traveling controller 18 in the vehicle control device.

What is claimed is:

1. A vehicle control device comprising:
an electronic control unit (ECU) including at least one processor, programmed to:
recognize an external situation around a vehicle that includes a traffic participant based on detection information received from an external sensor;
acquire a first action schedule of the vehicle based on at least the recognized external situation;
after the first action schedule is acquired, notify a terminal, possessed by the traffic participant, of the first action schedule of the vehicle including a request for approval of the first action schedule;
determine whether a receiver has received the approval of the first action schedule from the traffic participant after the request for approval has been notified to the terminal, wherein the determination of approval is based on an input by the traffic participant at the terminal possessed by the traffic participant that occurs in response to the request for the approval of the first action schedule; and execute an operation of the vehicle in accordance with the first action schedule when the receiver receives the approval of the first action schedule from the terminal and suppress the operation of the vehicle in accordance with the first action schedule when the receiver does not receive the approval of the first action schedule from the terminal.

2. The vehicle control device according to claim 1, wherein the ECU is further programmed to:

acquire a position of the vehicle;

generate a first traveling plan of the vehicle based on the position of the vehicle and the external situation of the vehicle; and acquire information relating to vehicle behavior as the first action schedule of the vehicle from the first traveling plan of the vehicle.

3. The vehicle control device according to claim 2, wherein:

when the ECU does not receive the approval from the terminal, the ECU generates a second traveling plan different from the first traveling plan; and the ECU controls the vehicle in accordance with the second traveling plan.

4. The vehicle control device according to claim 3, wherein the second traveling plan includes at least one of (i) decelerating from a vehicle speed of the vehicle in the first traveling plan, (ii) decelerating before reaching the traffic participant, (iii) stopping temporarily in front of the traffic participant, (iv) stopping in front of the traffic participant, or (v) stopping autonomous driving control.

5. The vehicle control device according to claim 1, wherein the ECU is further programmed to:

acquire a position of the vehicle; and acquire position information of the terminal possessed by the traffic participant, acquire a position of the traffic participant based on the position of the vehicle and a relative position between the vehicle and the traffic participant acquired by the external sensor, and compare the position of the traffic participant with the position information of the terminal possessed by the traffic participant to specify the position of the traffic participant who possesses the terminal.

6. The vehicle control device according to claim 1, wherein the ECU is further programmed to:

calculate a time to collision (TTC) between the traffic participant recognized by the external situation recognition unit and the vehicle, the time to collision being obtained by dividing a relative distance between the traffic participant and the vehicle by a relative speed between the traffic participant and the vehicle;

wherein when a plurality of traffic participants are recognized, receive information relating to the approval of the traffic participant who has a minimum TTC from amongst the plurality of traffic participants;

control the vehicle based on the traveling plan to execute the first action schedule when the approval from the traffic participant who has the minimum TTC is received, and suppress the automatic traveling of the vehicle according to the traveling plan when the approval from the traffic participant who has the minimum TTC is not received.

7. A method of controlling a vehicle, comprising:

recognizing an external situation around a vehicle to recognize a traffic participant based on detection information received from an external sensor of the vehicle;

acquiring a first action schedule of the vehicle based on at least the recognized external situation;

notifying a terminal possessed by the traffic participant of the first action schedule of the vehicle to request an approval from the traffic participant of the first action schedule;

determining whether a receiver has received the approval of the first action schedule based on an input by the traffic participant from the terminal possessed by the traffic participant, wherein the input by the traffic participant occurs in response to the request of the approval of the first action schedule; and executing an operation of the vehicle in accordance with the first action schedule when the receiver receives the approval of the first action schedule from the terminal, and suppressing the operation of the vehicle in accordance with the first action schedule when the receiver does not receive the approval of the first action schedule from the terminal.

8. The method of controlling the vehicle according to claim 7, further comprising:

acquiring a position of the vehicle;

generating a first traveling plan of the vehicle based on the position of the vehicle and the external situation of the vehicle; and acquiring information relating to vehicle behavior as the first action schedule of the vehicle from the first traveling plan of the vehicle.

9. The method of controlling the vehicle according to claim 8, wherein:

when the approval is not received from the terminal, generating a second traveling plan different from the first traveling plan; and controlling the vehicle in accordance with the second traveling plan.

10. The method of controlling the vehicle according to claim 9, wherein the second traveling plan includes at least one of (i) decelerating from a vehicle speed of the vehicle in the first traveling plan, (ii) decelerating before reaching the traffic participant, (iii) stopping temporarily in front of the traffic participant, (iv) stopping in front of the traffic participant, or (v) stopping autonomous driving control.

11. The method of controlling the vehicle according to claim 7, further comprising:

acquiring a position of the vehicle; and acquiring position information of the terminal possessed by the traffic participant, acquiring a position of the traffic participant based on the position of the vehicle and a relative position between the vehicle and the traffic participant acquired by the external sensor, and comparing the position of the traffic participant with the position information of the terminal possessed by the traffic participant to specify the position of the traffic participant who possesses the terminal.

* * * * *